US012631867B2

(12) United States Patent
Engel

(10) Patent No.: US 12,631,867 B2
(45) Date of Patent: May 19, 2026

(54) CALIBRATION TARGET, FOURIER PTYCHOGRAPHIC IMAGING SYSTEM AND METHOD FOR CALIBRATING A FOURIER PTYCHOGRAPHIC IMAGING SYSTEM

(71) Applicant: Siemens Healthcare Diagnostics Inc., Tarrytown, NY (US)

(72) Inventor: Thomas Engel, Aalen (DE)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 99 days.

(21) Appl. No.: 18/847,218

(22) PCT Filed: Mar. 9, 2023

(86) PCT No.: PCT/IB2023/052233
§ 371 (c)(1),
(2) Date: Sep. 13, 2024

(87) PCT Pub. No.: WO2023/175452
PCT Pub. Date: Sep. 21, 2023

(65) Prior Publication Data
US 2025/0085527 A1      Mar. 13, 2025

(30) Foreign Application Priority Data

Mar. 17, 2022    (EP) ..................................... 22162680

(51) Int. Cl.
*G02B 21/36* (2006.01)
*G02B 21/34* (2006.01)
(52) U.S. Cl.
CPC .................................. *G02B 21/367* (2013.01)

(58) Field of Classification Search
CPC ...................................................... G02B 21/367
(Continued)

(56) References Cited

U.S. PATENT DOCUMENTS 9,497,379 B2 * 11/2016 Ou ........................ G02B 21/086
10,679,763 B2 * 6/2020 Zheng .................. G06V 20/693
(Continued)

OTHER PUBLICATIONS

Konda, P. et al.: "High-resolution microscopy with low-resolution objectives: correcting phase aberrations in Fourier ptychography"; Proceedings of SPIE; IEEE; US; vol. 9630; Sep. 23, 2015; pp. 96300X-96300X; XP060061255; DOI: 10.1117/122191338; ISBN: 978-1-62841-730-2; (2015).
(Continued)

*Primary Examiner* — Jayanti K Patel
*Assistant Examiner* — Richard B Carter
(74) *Attorney, Agent, or Firm* — Dugan & Dugan, PC

(57) ABSTRACT

The invention relates to a calibration target for a Fourier ptychographic imaging system, comprising at least a first plane and a second plane, wherein the first plane and the second plane are parallel to each other and comprise a predefined distance between each other, wherein the first plane comprises a first calibration structure and the second plane comprises a second calibration structure, wherein the first calibration structure is configured to be suitable for centering itself in relation to an optical component and/or a camera of the Fourier ptychographic imaging system, and wherein the second calibration structure is configured to be suitable for determining, directly or in projection onto the first plane, a position of at least one characteristic or predetermined feature of the first calibration structure.

17 Claims, 6 Drawing Sheets

(58) Field of Classification Search
　　USPC ...................................................... 348/79, 80
　　See application file for complete search history.

(56)　　　　　　　　References Cited

U.S. PATENT DOCUMENTS

| 11,347,045 | B2 * | 5/2022 | Cohen ................ G02B 21/0084 |
| 2016/0178883 | A1 * | 6/2016 | Horstmeyer ......... G02B 21/367 |
| | | | 348/80 |
| 2017/0146788 | A1 * | 5/2017 | Waller .................... G06T 19/20 |
| 2017/0280039 | A1 * | 9/2017 | Stoppe ................. H04N 23/951 |
| 2018/0120553 | A1 | 5/2018 | Leshem et al. |

OTHER PUBLICATIONS

Konda, P. et al.: "Multi-aperture Fourier ptychographic microscopy, theory and validation"; Optics and Lasers in Engineering; Elsevier; Amsterdam; NL; vol. 138; Oct. 13, 2020 (Oct. 13, 2020); XP086374633; 0143-8166; DOI: 10.1016/J.OPTLASENG.2020.106410.
Liu, X. et al. "A method of vision localization measurement to assist Fourier ptychographic microscopy"; Proceedings of SPIE; ISSN 0277-786X vol. 10524]; SPIE; US; vol. 10827; Jul. 24, 2018; pp. 108270J-108270J; XP060108103; DOI: 10.1117/12.2501042; ISBN: 978-1-5106-1533-5; (2018).

* cited by examiner a)
S b)
S c)
S d)
S e)
S f)
S g)
S h)
S i)
S a)

b)

c)

a)

b)

c)

CALIBRATION TARGET, FOURIER PTYCHOGRAPHIC IMAGING SYSTEM AND METHOD FOR CALIBRATING A FOURIER PTYCHOGRAPHIC IMAGING SYSTEM

CROSS REFERENCE TO RELATED APPLICATIONS

This is a 371 of PCT/IB2023/052233, filed Mar. 9, 2023, which claims priority to European Patent Application No. EP 22162680.7, filed Mar. 17, 2022, both of which are hereby incorporated by reference herein in their entireties for all purposes.

FIELD

The present invention relates to a calibration target for a Fourier ptychographic imaging system, a Fourier ptychographic imaging system and a method for calibrating a Fourier ptychographic imaging system.

BACKGROUND

Fourier Ptychography Microscopy (FPM) is a novel computational microscopy technique that generates high resolution images at large Field of Views (FoV). This is achieved by capturing an image sequence of a region of interest of an object under various illumination angles greater than the Numerical Aperture (NA) of the used objective in bright-field mode and/or dark-field mode, and iteratively combining these images in Fourier space into a single high-resolution image.

So far, the calibration of illumination in an FPM system has been performed using images of binary (e.g., black/white or transparent/non-transparent) single-layer planar objects, especially with test structures thereon such as a Siemens star or gratings. From the diffraction patterns of the light beams after passing through the object, the azimuthal direction of illumination can also be determined. The polar angle is mostly taken from the mechanical design of the test structures, since manufacturing errors are small in this direction.

Accordingly, it is an object of the present invention to provide a solution for calibrating the illumination relative to an imaging system using Fourier ptychography as the operating principle, which is different from the state-of-the-art calibration solutions.

SUMMARY OF THE INVENTION

This objective is inventively achieved by the subject matter of the independent claims. Advantageous further developments may be taken from the dependent claims.

The invention provides, according to a first aspect, a calibration target for a Fourier ptychographic imaging system, comprising at least a first plane and a second plane. The first plane and the second plane are parallel to each other and comprise a predefined distance between each other. The first plane comprises a first calibration structure and the second plane comprises a second calibration structure. The first calibration structure is configured to be suitable for centering itself in relation to an optical component and/or a camera of the Fourier ptychographic imaging system. The second calibration structure is configured to be suitable for determining, directly or in projection onto the first plane, a position of at least one characteristic or predetermined feature of the first calibration structure.

It is favorable that the present invention provides a calibration target with at least two parallel planes/layers spaced from each other with a predefined distance. It is particularly preferred if the structure of the calibration target is the same as or as close as possible to that of the object to be measured later. If the object to be measured contains an object carrier on which the sample/object to be examined is applied, it is advantageous that the calibration target consists of the same material and is in the same (typical or nominal) thickness as the object carrier.

In a preferable embodiment of the calibration target, the position of at least one characteristic or predetermined feature of the first calibration structure is the center of the first calibration structure.

If the first calibration structure is, e.g., a circle, an ellipse, or a ring-shaped or circle-shaped structure, the position of at least one characteristic or predetermined feature of the first calibration structure is the center of such a structure.

In a further preferable embodiment of the calibration target, the first calibration structure and/or the second calibration structure comprises a cross, a circle, a square, a line segment, or a ring.

Further, the first and/or second calibration structure may for example be a point structure, or it may also be designed indirectly in such a way that imaginary or specified geometric structures or line patterns intersect in the center of the calibration structure.

Alternatively, it is possible to specify the center via the symmetry of a structure, e.g., a circular or ring-shaped structure. Calibration structures which are similar thereto or different therefrom may also be possible.

In addition, the first and second calibration structures do not have to be or have closed contours, i.e., a complete circle. Divided structures such as sectors/segments of a circle are also possible.

The invention provides, according to a second aspect, a Fourier ptychographic imaging system comprising the calibration target according to the first aspect, an object plane in which an object to be illuminated is placeable, and a light source. The first plane of the calibration target is configured to be arranged in the object plane, and the second plane of the calibration target is spaced from the first plane of the calibration target in an illumination direction of the light source.

In a preferable embodiment of the Fourier ptychographic imaging system, the second calibration structure of the second plane of the calibration target is configured to be projectable into the object plane via illuminations by the light source, and the second calibration structure of the second plane comprises a different line width, size, and/or shape from the first calibration structure of the first plane.

Thereby, structures at the object plane and at the second plane of the calibration target can be recognized and distinguished without any doubt.

In a further preferable embodiment of the Fourier ptychographic imaging system, the first calibration structure comprises a first center point, and the second calibration structure comprises a second center point which corresponds to a projected second center point as a projection of the second center point in the first plane. The first center point and the projected second center point define a line which is parallel to the object plane.

It is particularly advantageous if the calibration structure on the object plane and the calibration structure on the second plane are already arranged as precisely as possible relative to each other during the manufacturing process and, for example, have the same center points along the optical axis, i.e., points that lie on a straight line that is perpendicular to the object plane. The center points are referred to as points of symmetry or the center of the respective structure, e.g., a cross, a circle, or an ellipse.

In a further preferable embodiment of the Fourier ptychographic imaging system, a size of the first and second calibration structures is configured to be determined based on a field of view of the Fourier ptychographic imaging system. Preferably, for all illumination conditions to be calibrated, there should be a sufficient portion to determine the reference point for the respective calibration structure.

The size of the structures on the calibration target is selected so that these structures can be detected within the FoV of the imaging system. Consequently, at least one structural feature in the object plane and at least one structural feature in the second plane of the calibration target can be determined with sufficient accuracy for the illumination calibration.

In a further preferable embodiment of the Fourier ptychographic imaging system, the calibration target comprises optically a diffuse effect at the second calibration structure or in a layer which is close to the second calibration structure.

Thereby, the signal quality and thus the image quality as well as the achieved calibration result can be optimized at illumination angles that are larger than the aperture angle of the imaging optics.

In addition, alternatively or particularly preferred, the structures on the object plane and on the second plane may also by themselves be diffuse, so that these structures can then be seen directly, either as being darkened in bright-field mode by the scattering, or as being brightened in dark-field mode, compared to a non-scattering environment of the structures. For this purpose, the structural elements themselves may have diffractive and/or refractive components, e.g., fine, light-diffracting structural elements or a rough surface, which are produced, e.g., with etching technologies or structuring technologies.

In a further preferable embodiment of the Fourier ptychographic imaging system, the light source comprises an array of sub-light-sources, in particular an array of light-emitting diodes, LEDs, which are configured to be sequentially switched, wherein the Fourier ptychographic imaging system (100) comprises a camera which is configured to capture images of the calibration target during the sequential switching. Illumination angles of the sub-light sources are determinable based on a relative position between the second calibration structure and the first calibration structure in the captured images.

From the relative position of the calibration structures which were either manufactured with sufficient relative positioning accuracy relative to each other during the manufacturing process, or determined after manufacturing by measurement or calibration, the direction of incidence or the illumination angle for each of the sub-light-sources in the array can be determined.

The direction of the illumination as an azimuthal angle in relation to a reference axis which may be provided on the calibration target or determined from the measuring system, e.g., via the alignment of the camera, can be determined via the direction of the connecting line between the center/symmetry points of the first and second calibration structures and the distance of the center/symmetry points in an image taken. In addition, the polar angle of the illumination can be determined by the distance of these center/symmetry points.

The following table as an example shows the values for a calibration target/object in a thickness of 0.7 mm and 1 mm which corresponds to the distance between the first and second planes, with the refractive index of 1.5 for different angles of incidence of the illumination:

| Angle of Incidence | Sin | ArcTan(Sin/n) | d = 0.7 mm | d = 1 mm |
|---|---|---|---|---|
| 0 | 0 | 0 | 0.000 | 0.000 |
| 5 | 0.08715574 | 0.058038573 | 0.041 | 0.058 |
| 10 | 0.17364818 | 0.115252422 | 0.081 | 0.115 |
| 15 | 0.25881905 | 0.170863628 | 0.120 | 0.171 |
| 20 | 0.34202014 | 0.22418081 | 0.157 | 0.224 |
| 25 | 0.42261826 | 0.274626577 | 0.192 | 0.275 |
| 30 | 0.5 | 0.321750554 | 0.225 | 0.322 |
| 35 | 0.57357644 | 0.365228801 | 0.256 | 0.365 |
| 40 | 0.64278761 | 0.404852623 | 0.283 | 0.405 |
| 45 | 0.70710678 | 0.440510663 | 0.308 | 0.441 |
| 50 | 0.76604444 | 0.472167984 | 0.331 | 0.472 |

In the first column of the table above, different (polar) angles of incidence of the illumination in a range between 0 and 50 degrees are listed. The second column of the table corresponds to the sine of the respective angle of incidence, and the third column of the table corresponds to the result of the calculation arctan (sin($\varphi$)/n), where $\varphi$ stands for the (polar) angle of incidence, and n represents the refractive index of the calibration target. The fourth and fifth columns correspond to the distance of the center/symmetry points in the taken images, with a thickness of the calibration target of 0.7 mm and 1 mm, under the respective angle of incidence.

Apart from this, the measurements for the illumination calibration can be made separately for different colors of the light in order to capture any dispersion effects that become noticeable via slightly changed illumination angles and are used as input parameters in the image synthesis. In this way, the quality of the reconstruction can be optimized.

Alternatively and preferably, the calibration can be carried out exactly with the wavelength and bandwidth used in the later measurement, and thereby capturing an effective illumination direction.

It is advantageous if the measurement can be made with only one image in order to minimize or exclude possible further influences on the measurement. Alternatively, it is possible, for example, to take two measurements/images, with one focused on the structure of the object plane and the other focused on the second plane. If the axial offset of the imaging system along the focus axis is known, the optical thickness of the calibration target/object can also be determined in the measurement setup.

For the measurement of the incident light direction, it is important that the measurement for the lateral displacement of the second calibration structure cannot be performed in the focused position, because then no lateral displacement would be measurable. Thus, for reasons of reproducibility (regarding distance measurement, process accuracy, focus adjustment etc.), instead of the fixed thickness of the calibration target as the preferred solution, as an alternative or bypassing solution, it is also sufficient to have one calibration structure in at least two focus positions, and thereby also partially defocused, and the lateral displacement of the structure is measured. In order to measure the dispersion effects mentioned above, the calibration structure should then be placed on the illumination plane which is the second plane of the calibration target.

Additionally, it is advantageous if several such calibration structures are present in the camera's FoV, because with one image, an illumination calibration can be performed simultaneously for different image locations. It is advantageous that the further calibration structures have simplified, compact, or small centering structures, because these can then be easily located via the first calibration structure, leaving more usable area for the projections of calibration structures of the second plane.

The invention provides, according to a third aspect, a method for calibrating a Fourier ptychographic imaging system which comprises a camera, an optical component which is in particular an objective, and a light source including an array of sub-light-sources. The method comprises: placing a calibration target between the light source and the optical component, wherein the calibration target comprises at least a first plane and a second plane, wherein the first plane and the second plane are parallel to each other and comprise a predefined distance between each other, wherein the first plane comprises a first calibration structure and the second plane comprises a second calibration structure, and wherein the second calibration structure is suitable for determining, directly or in projection onto the first plane, a position of at least one characteristic or predetermined feature of the first calibration structure; centering the first calibration structure in relation to the optical component and/or the camera; capturing images of the calibration target during sequentially switching the sub-light-sources; analyzing a relative position between the second calibration structure and the first calibration structure in the captured images; and determining illumination angles of the sub-light-sources based on an analysis result.

It is advantageous that the calibration target which corresponds, e.g., to the shape/geometry of an object carrier is placed into the measuring system, so that the first plane of the calibration target preferably corresponds to the position of an object to be measured later on in the system to be measured later.

It is preferable that the first calibration structure is centered in relation to the optical component and/or the camera with axial illumination in transmitted light, i.e., with the LED located on, at the optical axis, or with the smallest distance to the optical axis.

For the image capturing of the calibration target during sequentially switching the sub-light-sources, if the measuring accuracy allows it, it is also possible to use several sub-light-sources/LEDs per measurement image/camera image.

If necessary, the images are captured in a color-selective manner with band-pass filters, or, if light sources can be controlled separately in terms of color, with separate control. Thereby, dispersion effects in the calibration target and, if necessary, for the measurement object or in the optical system itself can be recorded or retained.

In a preferable embodiment of the method, the method further comprises creating a calibration data set for the illumination angles of the sub-light-sources. That is to say, an adjustment data set is created for a measuring arrangement.

In a preferable embodiment of the method, the method further comprises providing the calibration data set for an evaluation of a measurement arrangement. For instance, the calibration data set may be in the form of a classified data structure, e.g., in the form of a table, where the values for the azimuth and polar angles for each (color of) LED(s) are included.

In a further preferable embodiment of the method, wherein the first plane of the calibration target is placed in an object plane of the Fourier ptychographic imaging system in which an object to be illuminated is placeable, and the second plane of the calibration target is spaced from the first plane of the calibration target in the direction of the illumination system.

In a further preferable embodiment of the method, wherein the analyzing a relative position between the second calibration structure and the first calibration structure in the captured images comprises: determining a center of the first calibration structure of the first plane in a camera image; determining a center of the second calibration structure of the second plane in the camera image; determining a length of a connecting line between both of the centers; determining a polar incidence/illumination angle of a sub-light-source for capturing the camera image based on the determined length; and determining an azimuthal incidence/illumination angle of the sub-light-source by determining an angle between the connecting line and a reference direction.

Alternatively, a reference point of the first or second calibration structure may be used instead of the center thereof.

The length of the connecting line may be determined in camera coordinates by means of, e.g., pixel pitches, or in object coordinates in object space or by means of images of the camera.

The reference direction may be defined in the imaging system, e.g., being the x-axis of the measuring table or the x-direction in the camera image.

In a further preferable embodiment of the method, wherein each illumination angle of the respective sub-light-source in the created calibration data set comprises a polar incidence/illumination angle and an azimuthal incidence/illumination angle. In particular, the polar and azimuthal angles are for each of the LEDs or each color of each of the LEDs that are to be used in a planned measurement.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate embodiments of the present invention and together with the description serve to explain the principles of the invention.

Other embodiments of the present invention and many of the intended advantages of the present invention will be readily appreciated as they become better understood by reference to the following detailed description. Like reference numerals designate corresponding similar parts.

FIG. 1 shows schematically a calibration target for a Fourier ptychographic imaging system according to an embodiment of the invention, in a perspective view;

FIG. 2 shows schematically a calibration target for a Fourier ptychographic imaging system according to another embodiment of the invention, in a perspective view;

Figure 3:
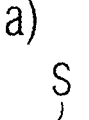
Figure 3:
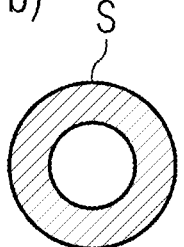
Figure 3:
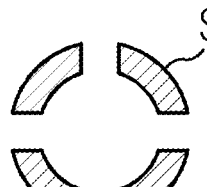
Figure 3:
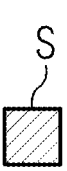
Figure 3:
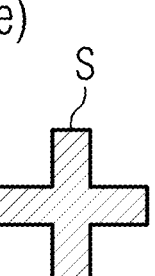
Figure 3:
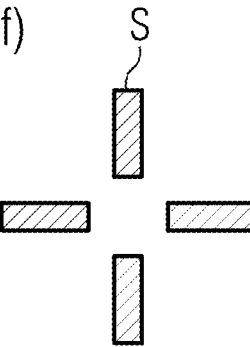
Figure 3:
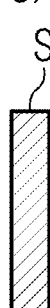
Figure 3:
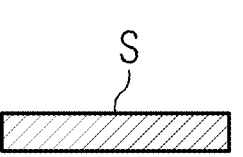
Figure 3:
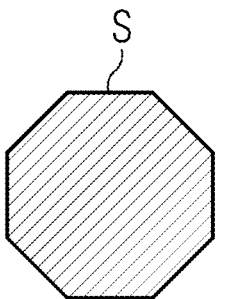
Figure 4:
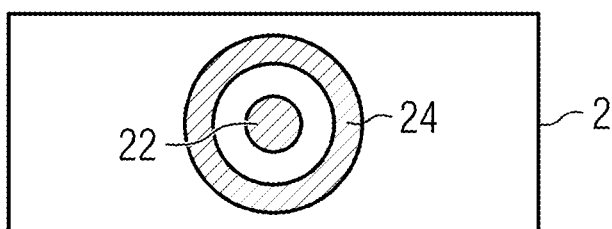
Figure 4:
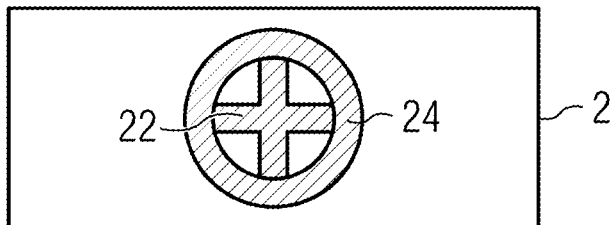
Figure 4:
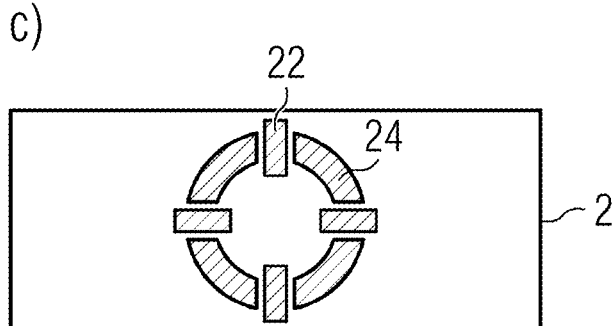
Figure 5:
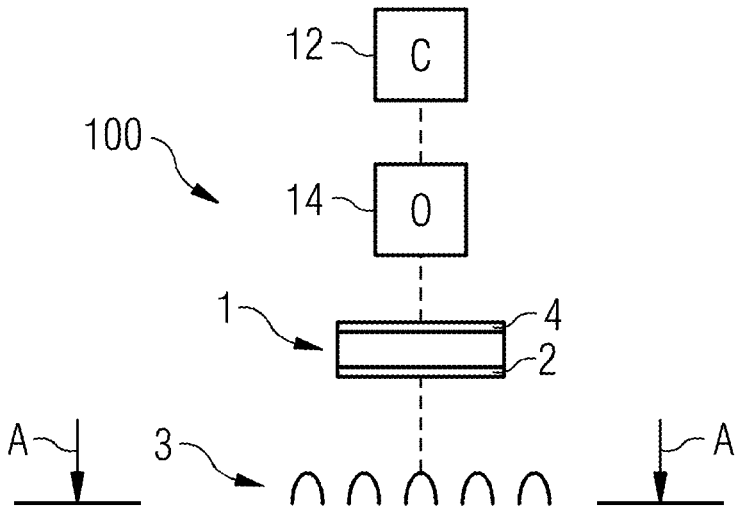
Figure 6:
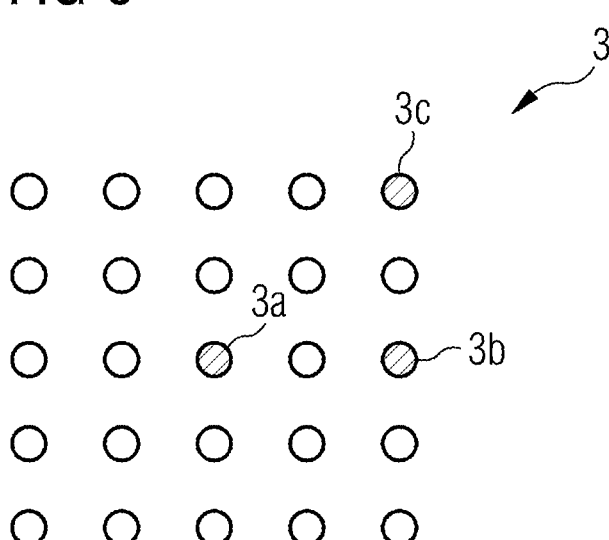
Figure 7:
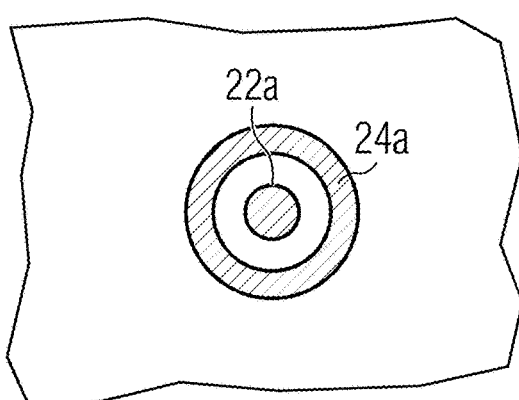
Figure 7:
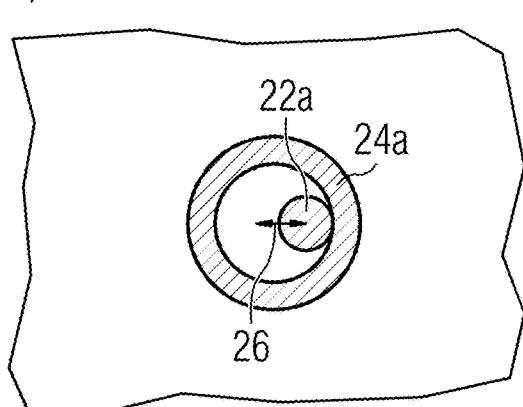
Figure 7:
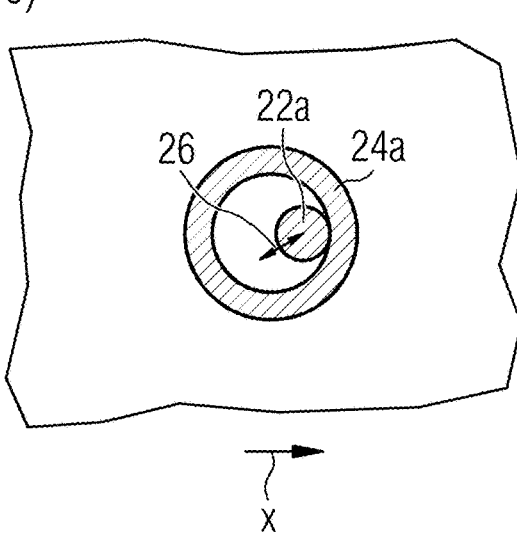
Figure 8:
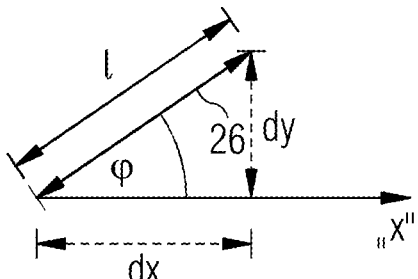
Figure 9:
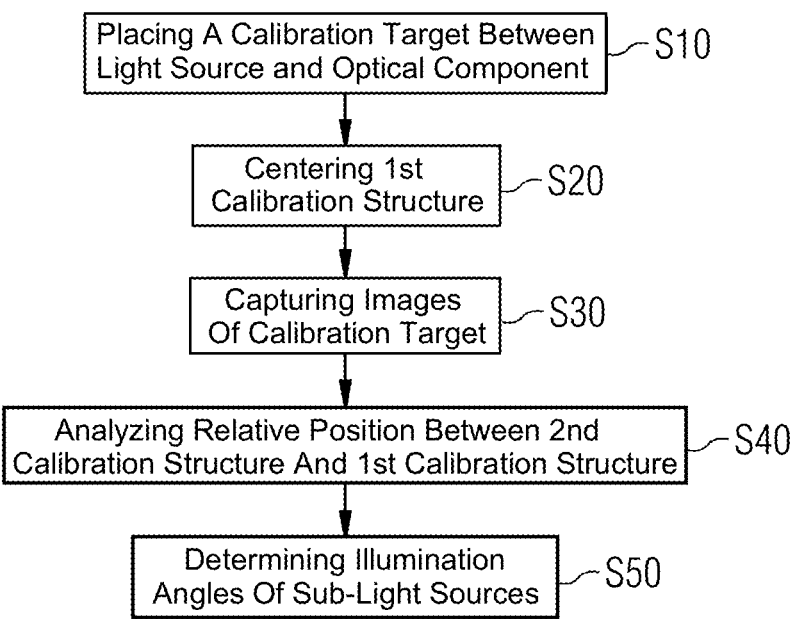

FIGS. 3a)-3i) show schematically the first and/or second calibration structure(s) of a calibration target in different embodiments;

FIGS. 4a)-4c) show schematically a top view of the first and second calibration structures of a calibration target in different embodiments;

FIG. 5 shows schematically a Fourier ptychographic imaging system according to an embodiment of the invention;

FIG. 6 shows schematically an LED array of a Fourier ptychographic imaging system according to the embodiment of the invention shown in FIG. 5;

FIGS. 7*a*)-7*c*) show schematically images captured when different LEDs are turned on;

FIG. 8 shows a way of determining the polar illumination angle of an LED using coordinate geometry; and FIG. 9 shows a block diagram of an embodiment for calibrating a Fourier ptychographic imaging system.

DETAILED DESCRIPTION OF THE INVENTION

Figure 1:
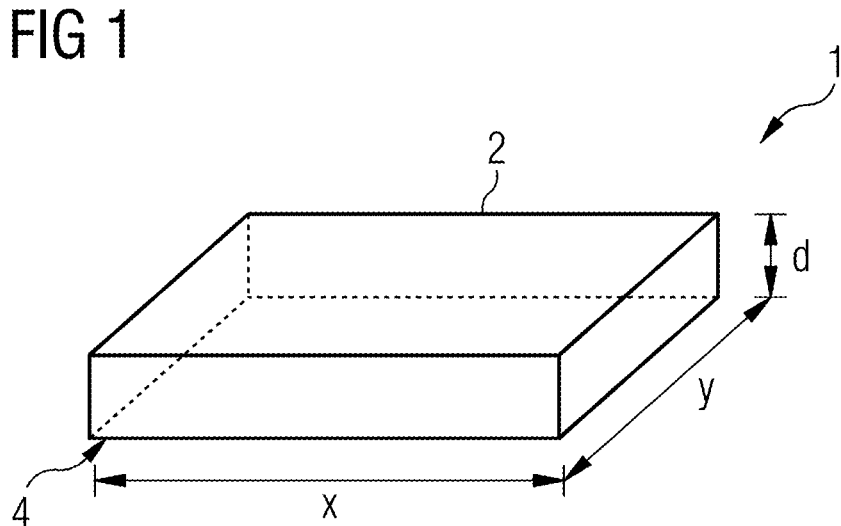

FIG. 1 shows schematically in a perspective view a calibration target 1 for a Fourier ptychographic imaging system 100. The calibration target 1 comprises a first plane 2 and a second plane 4, wherein the first plane 2 and the second plane 4 are parallel to each other and comprise a predefined distance d between each other.

Figure 2:
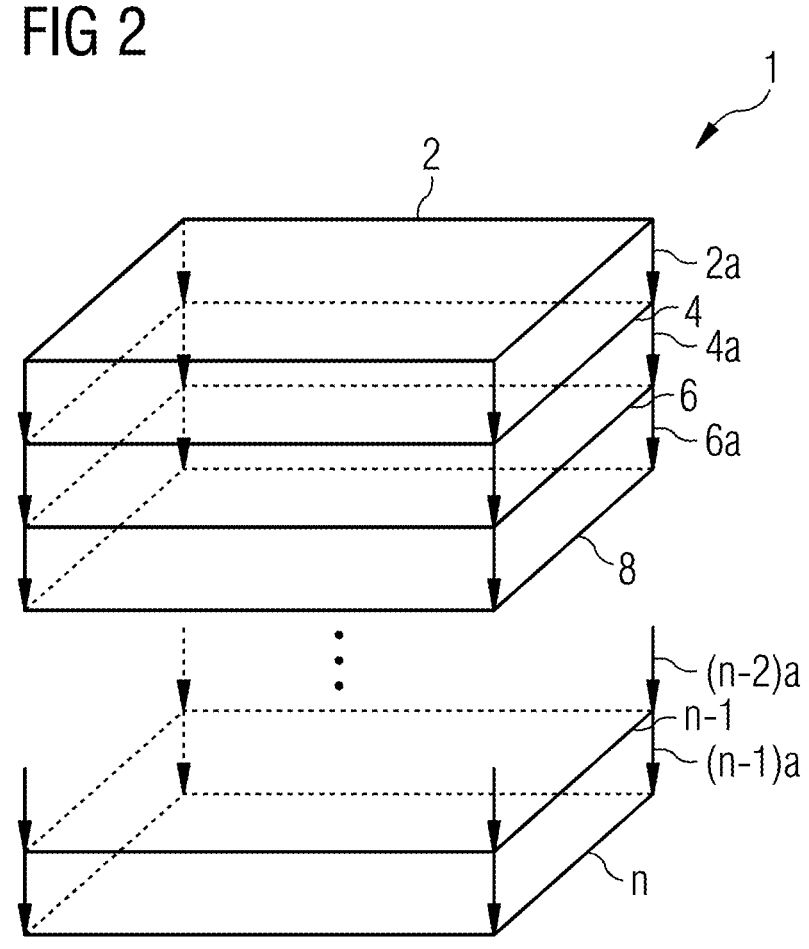

FIG. 2 shows schematically in a perspective view another calibration target 1 for a Fourier ptychographic imaging system 100. This calibration target 1 has a multi-layer structure and comprises n layers/planes in total, i.e., a first plane 2, a second plane 4, a third plane 6, . . . , an (n−1)th plane n−1, and an nth plane n. These planes/layers are parallel to each other.

The distance between the first plane 2 and the second plane 4 is denoted by the reference sign 2*a*, the distance between the second plane 4 and the third plane 6 is denoted by the reference sign 4*a*, . . . , and the distance between the (n−1)th plane n−1 and the nth plane n is denoted by the reference sign (n−1)a. The part of the calibration target 1 between the first plane 2 and the second plane 4 consists of a first material with a first refractive index, the part of the calibration target 1 between the second plane 4 and the third plane 6 consists of a second material with a second refractive index, . . . , and the part of the calibration target 1 between the (n−1)th plane n−1 and the nth plane n consists of an (n−1)th material with an (n−1)th refractive index.

FIGS. 3*a*)-3*i*) show different structures which may be used as the first calibration structure 22 in the first plane 2 and/or the second calibration structure 24 in the second plane 4 of a calibration target 1. Specifically, FIG. 3*a*) shows a circle; FIG. 3*b*) shows a ring; FIG. 3*c*) shows four segments of a ring; FIG. 3*d*) shows a square; FIG. 3*e*) shows a cross; FIG. 3*f*) shows four segments of a cross; FIG. 3*g*) shows a vertical line; FIG. 3*h*) shows a horizontal line; and FIG. 3*i*) shows an octagon.

These shown structures only serve as examples suitable to be the first calibration structure 22 and/or the second calibration structure 24. Other structures which are not shown and from which a center point or a symmetry point can be determined are also suitable.

The textured surface S shown in FIGS. 3*a*)-3*i*) may include material coated or deposited and structured elements like chrome on a glass, a color, and/or a printed image. The textured surface S may also be matted, and/or etched.

Each of FIGS. 4*a*)-4*c*) shows a top view of a calibration target 1. In particular, the second calibration structure 24 of the second plane 4 is projected onto the first plane 2 in which the first calibration structure 22 is located. Specifically, FIG. 4*a*) shows a circle as the first calibration structure 22 and a ring as the second calibration structure 24 surrounding the circle; FIG. 4*b*) shows a cross as the first calibration structure 22 and a ring as the second calibration structure 24 surrounding the cross; and FIG. 4*c*) shows four segments of a cross as the first calibration structure 22 and four segments of a ring as the second calibration structure 24, wherein each cross segment is arranged to be adjacent to two segments of the circle.

A preferred condition in the manufacturing process of a calibration target 1 is that the centers of the structures 22 and 24 precisely overlap in the direction perpendicular to the first plane 2.

FIG. 5 shows schematically a Fourier ptychographic imaging system 100 which comprises a camera 12 for capturing images, an objective 14, a calibration target 1, and a two-dimensional array of LEDs 3. The first plane 2 of the calibration target 1 is arranged in the object plane, and the second plane 4 of the calibration target 1 is spaced from the first plane 2 in an illumination direction of the LED arrays 3. The calibration target 1, in particular the first and second calibration structures 22, 24, is centered in relation to the camera 12, the objective 14, and the LED array 3.

FIG. 6 shows schematically the LED array 3 of the Fourier ptychographic imaging system 100 shown in FIG. 5, in the view direction A-A. As shown in FIG. 6, the LED array 3 includes 25 LEDs in total, with 5 LEDs per row and 5 LEDS per column.

When the LED 3*a* in the center of the LED array is turned on, an image is captured by the camera 12, which image is schematically shown in FIG. 7*a*). It can be taken from this image that the centers of the circle 22*a* corresponding to the second calibration structure and of the ring 24*a* corresponding to the first calibration structure precisely overlap.

When the LED 3*a* in the center of the LED array is turned off and the LED 3*b* on the right side of the array is turned on, an image as shown in FIG. 7*b*) is taken, which shows that the circle 22*a* corresponding to the second calibration structure has a displacement/offset rightwards, while the ring 24*a* corresponding to the first calibration structure remain unaffected. This displacement/offset is denoted by the arrow 26 in FIG. 7*b*).

When the LED 3*b* is turned off and the LED 3*c* in the top right-hand corner of the array is turned on, an image as shown in FIG. 7*c*) is taken, which shows that the circle 22*a* corresponding to the second calibration structure has a displacement/offset towards the top right-hand side of the inner wall of the ring 24*a*, while the ring 24*a* corresponding to the first calibration structure remains unaffected. This displacement/offset is also denoted by the arrow 26 in FIG. 7*c*).

FIG. 8 shows a way of determining the polar incidence/ illumination angle φ of an LED using coordinate geometry. Specifically, the length 1 of the displacement 26 can be determined by the following formula:

$$l = \sqrt{d_x^2 + d_y^2},$$

where the $d_x$ and $d_y$ are measured from the origin with signs. The quadrant resulting from the signs must be determined correctly when a correct angle is to be determined. The polar incidence/illumination angle φ can be determined to be the result of $$\arctan\frac{d_y}{d_x}.$$

In addition, the direction of the arrow 26 is the measurement of the azimuthal angle of the illumination direction of the respective LED 3*b* or 3*c*, e.g., with respect to the x-axis of the camera or the pixel grid.

The embodiment of the method for calibrating a Fourier ptychographic imaging system shown in FIG. 9 comprises three steps. In step S10, a calibration target is placed between the light source and the optical component, wherein the calibration target comprises at least a first plane and a second plane, wherein the first plane and the second plane are parallel to each other and comprise a predefined distance between each other, wherein the first plane comprises a first calibration structure and the second plane comprises a second calibration structure, and wherein the second calibration structure is suitable for determining, directly or in projection onto the first plane, a position of at least one characteristic or predetermined feature of the first calibration structure. In step S20, the first calibration structure is centered in relation to the optical component and/or the camera. In step S30, images of the calibration target are captured during sequentially switching the sub-light-sources. In step S40, a relative position between the second calibration structure and the first calibration structure is analyzed in the captured images. In step S50, illumination angles of the sub-light-sources are determined based on an analysis result.

It should be understood that all advantageous options, variance in modifications described herein, and the foregoing with respect to embodiments of the calibration target according to the first aspect may be equally applied to embodiments of the Fourier ptychographic imaging system according to the second aspect and to the embodiments of the method according to the third aspect, and vice versa.

In the foregoing detailed description, various features are grouped together in one or more examples for the purpose of streamlining the disclosure. It is to be understood that the above description is intended to be illustrative, and not restrictive. It is intended to cover alternatives, modifications and equivalents. Many other examples will be apparent to one skilled in the art upon reviewing the above specification.

LIST OF REFERENCE SIGNS 1 calibration target
2 first plane
3 LED(s)
4 second plane
6 third plane
8 fourth plane
n−1 (n−1)th plane
n nth plane
12 camera
14 objective
22 first calibration structure
22*a* circle in an image
24 second calibration structure
24*a* ring in an image
26 displacement of center
100 Fourier ptychographic imaging system
d distance between the first and second planes
S textured surface
1 length of displacement
Φ polar incidence/illumination angel
x axis of the camera
A-A view direction
S10-S50 method steps
2*a*, 4*a* distance between adjacent planes
6*a* distance between adjacent planes
(n−2)a distance between adjacent planes
(n−1)a distance between adjacent planes

The invention claimed is:

1. A calibration target for a Fourier ptychographic imaging system, comprising at least a first plane and a second plane,
   wherein the first plane and the second plane are parallel to each other and comprise a predefined distance between each other,
   wherein the first plane comprises a first calibration structure and the second plane comprises a second calibration structure,
   wherein the first calibration structure is configured to be suitable for centering itself in relation to an optical component or a camera of the Fourier ptychographic imaging system, and
   wherein the second calibration structure is configured to be suitable for determining, directly or in projection onto the first plane, a position of at least one characteristic or predetermined feature of the first calibration structure.

2. The calibration target according to claim 1, wherein the position of at least one characteristic or predetermined feature of the first calibration structure is the center of the first calibration structure.

3. The calibration target according to claim 1, wherein the first calibration structure or the second calibration structure comprises a cross, a circle, a square, a line segment, or a ring.

4. A Fourier ptychographic imaging system comprising the calibration target according to claim 1, an object plane in which an object to be illuminated is placeable, and a light source, wherein the first plane of the calibration target is configured to be arranged in the object plane, and the second plane of the calibration target is spaced from the first plane of the calibration target in an illumination direction of the light source.

5. The Fourier ptychographic imaging system according to claim 4, wherein the second calibration structure of the second plane of the calibration target is configured to be projectable into the object plane via illuminations by the light source, and the second calibration structure of the second plane comprises a different line width, size, or shape from the first calibration structure of the first plane.

6. The Fourier ptychographic imaging system according to claim 4, wherein the first calibration structure comprises a first center point, wherein the second calibration structure comprises a second center point which corresponds to a projected second center point as a projection of the second center point in the first plane, and wherein the first center point and the projected second center point form a line which is parallel to the object plane.

7. The Fourier ptychographic imaging system according to claim 4, wherein a size of the first and second calibration structures is configured to be determined based on a field of view of the Fourier ptychographic imaging system.

8. The Fourier ptychographic imaging system according to claim 4, wherein the calibration target comprises optically a diffuse effect at the second calibration structure or in a layer which is close to the second calibration structure.

9. The Fourier ptychographic imaging system according to claim 4, wherein the light source comprises an array of sub-light-sources, which are configured to be sequentially switched, wherein the Fourier ptychographic imaging system comprises a camera which is configured to capture images of the calibration target during the sequential switching, wherein illumination angles or spatial directions of the sub-light sources are determinable based on a relative position between the second calibration structure and the first calibration structure in the captured images.

10. The Fourier ptychographic imaging system according to claim 9, wherein the array of sub-light-sources comprises an array of light-emitting diodes.

11. A method for calibrating a Fourier ptychographic imaging system which comprises a camera, an optical component, and a light source including an array of sub-light-sources, the method comprising:

placing a calibration target between the light source and the optical component, wherein the calibration target comprises at least a first plane and a second plane, wherein the first plane and the second plane are parallel to each other and comprise a predefined distance between each other, wherein the first plane comprises a first calibration structure and the second plane comprises a second calibration structure, and wherein the second calibration structure is suitable for determining, directly or in projection onto the first plane, a position of at least one characteristic or predetermined feature of the first calibration structure;

centering the first calibration structure in relation to the optical component or the camera;

capturing images of the calibration target during sequentially switching the sub-light-sources;

analyzing a relative position between the second calibration structure and the first calibration structure in the captured images; and determining illumination angles of the sub-light-sources based on an analysis result.

12. The method according to claim 11, further comprising creating a calibration data set for the illumination angles of the sub-light-sources.

13. The method according to claim 12, further comprising providing the calibration data set for an evaluation of a measurement arrangement.

14. The method according to claim 11, wherein the first plane of the calibration target is placed in an object plane of the Fourier ptychographic imaging system in which an object to be illuminated is placeable, and the second plane of the calibration target is spaced from the first plane of the calibration target in the direction of the illumination system.

15. The method according to claim 11, wherein the analyzing a relative position between the second calibration structure and the first calibration structure in the captured images comprises:

determining a center of the first calibration structure of the first plane in a camera image;

determining a center of the second calibration structure of the second plane in the camera image;

determining a length of a connecting line between both of the centers;

determining a polar incidence/illumination angle of a sub-light-source for capturing the camera image based on the determined length; and determining an azimuthal incidence/illumination angle of the sub-light-source by determining an angle between the connecting line and a reference direction.

16. The method according to claim 15, wherein each illumination angle of the respective sub-light-source in the created calibration data set comprises a polar incidence/illumination angle and an azimuthal incidence/illumination angle.

17. The method according to claim 11, wherein the optical component comprises an objective.

\* \* \* \* \*